United States Patent [19]

Madsen

[11] Patent Number: 5,359,838
[45] Date of Patent: Nov. 1, 1994

[54] APPARATUS FOR CONTROLLING THE DIRECTION OF A CROP DISCHARGE SPOUT ON AGRICULTURAL MACHINERY WITH RESPECT TO AN ASSOCIATED COLLECTOR

[76] Inventor: William H. Madsen, P.O. Box 23, Mayerthorpe, Alberta, Canada, T0E 1N0

[21] Appl. No.: 187,056

[22] Filed: Jan. 27, 1994

[51] Int. Cl.$^5$ ............................................. A01D 17/00
[52] U.S. Cl. .......................................... 56/16.6; 56/14.9
[58] Field of Search ................ 56/14.7, 14.9, 16.4, 56/16.6, 15.6, 15.9; 414/334, 335; 460/14

[56] References Cited

U.S. PATENT DOCUMENTS

| | | | |
|---|---|---|---|
| 2,905,343 | 9/1959 | Heising | 214/42 |
| 3,144,146 | 8/1964 | Strickland, Jr. | 214/135 |
| 3,166,204 | 1/1965 | De Buhr | 214/42 |
| 3,786,945 | 1/1974 | Symonds | 214/42 A |
| 4,042,132 | 8/1977 | Bohman et al. | 214/42 A |
| 4,376,609 | 3/1983 | Bohman et al. | 414/335 |
| 4,441,846 | 4/1984 | Johnson | 414/335 |
| 4,662,162 | 5/1987 | Bettencourt et al. | 56/14.9 |
| 5,167,581 | 12/1992 | Haag | 56/16.6 X |

Primary Examiner—Michael Powell Buiz
Attorney, Agent, or Firm—Anthony R. Lambert

[57] ABSTRACT

An apparatus for controlling the direction of a crop discharge spout on an agricultural machine with respect to an associated collector vehicle. The discharge spout has a stationary first section, a second section rotatable relative to the first section and a third section rotatable relative to the second section. The first section and the second section are rotatably connected at a lower joint; the second section and the third section are rotatably connected at an upper joint. A telescopic member extends between a drawbar on a collector vehicle and the second section. The second section of the discharge spout rotates about the lower joint in unison with the drawbar to maintain spout positioning relative to the collector vehicle. The third section moves with the second section. The telescopic member telescopically extends and retracts in response to downward and upward deflections of the drawbar. A drive motor is provided between the second section and the third section. The drive motor causes rotation of the third section about the upper joint, whereby control over the aim of the discharge spout is maintained by the operator.

8 Claims, 5 Drawing Sheets

APPARATUS FOR CONTROLLING THE DIRECTION OF A CROP DISCHARGE SPOUT ON AGRICULTURAL MACHINERY WITH RESPECT TO AN ASSOCIATED COLLECTOR

BACKGROUND OF THE INVENTION

Agricultural machinery, such as silage cutters, are pulled behind a tractor. An associated collector vehicle is coupled behind the silage cutter with a crop discharge spout on the silage cutter discharging crop into the associated collector vehicle. When the tractor turns a corner, however, the crop discharge spout on the silage cutter swings away from the associated collector vehicle and crop is lost. There is, therefore, a need for an apparatus for controlling the direction of the crop discharge spout.

A mechanical system for controlling the direction of the crop discharge spout was disclosed in U.S. Pat. No. 2,905,343 which issued to Deere & Company in 1959. This mechanical system included a rigid substantially upright standard having a first end secured to the discharge spout and a second end secured to a clevis style hitch on a drawbar on the associated collector vehicle. The rigid standard caused the discharge spout to swivel in unison with the lateral swinging of the drawbar. The mechanical system, as described, always had the discharge spout aimed at the center of the collector vehicle. It was not possible to maximize the load by directing crop discharge from the discharge spout into the corners of the collector vehicle. It was, similarly, not possible to swing the discharge spout sideways to load an adjacent collector vehicle. An elaborate support structure had to be incorporated into the design to prevent downward deflection of the drawbar as the rigid standard was incapable of withstanding such movement.

An alternative system adopted, as described as background in U.S. Pat. No. 3,786,945 which issued to Deere & Company in 1974 involved equipping the discharge spout with a worm and worm wheel arrangement with an elongate crank arm extending to within reach of the operator. In negotiating a corner, the operator would turn the crank to rotate the worm to laterally turn the spout. This system was considered unsafe as the operator had to look back and observe the spout to assure proper positioning while the tractor was moving forward.

At the present time the art has moved away from mechanical apparatus for controlling the direction of a crop discharge spout in favor of more sophisticated electronic systems as described in U.S. Pat. Nos. 3,786,945; 4,042,132; 4,376,609; and 4,441,846.

SUMMARY OF THE INVENTION

What is required is a mechanical apparatus for controlling the direction of a crop discharge spout which overcomes the drawbacks of the prior mechanical systems.

According to the present invention there is provided an apparatus for controlling the direction of a crop discharge spout on an agricultural machine with respect to an associated collector vehicle. The discharge spout has a stationary first section, a second section rotatable relative to the first section and a third section rotatable relative to the second section. The first section and the second section are rotatably connected at a lower joint. The second section and the third section are rotatably connected at an upper joint. A telescopic member extends between a drawbar on a collector vehicle and the second section. The second section of the discharge spout rotates about the lower joint in unison with the drawbar to maintain spout positioning relative to the collector vehicle. The third section moves with the second section. The telescopic member telescopically extends and retracts in response to downward and upward deflections of the drawbar. Drive means are provided between the second section and the third section. The drive means causes rotation of the third section about the upper joint, whereby control over the aim of the discharge spout is maintained by the operator.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
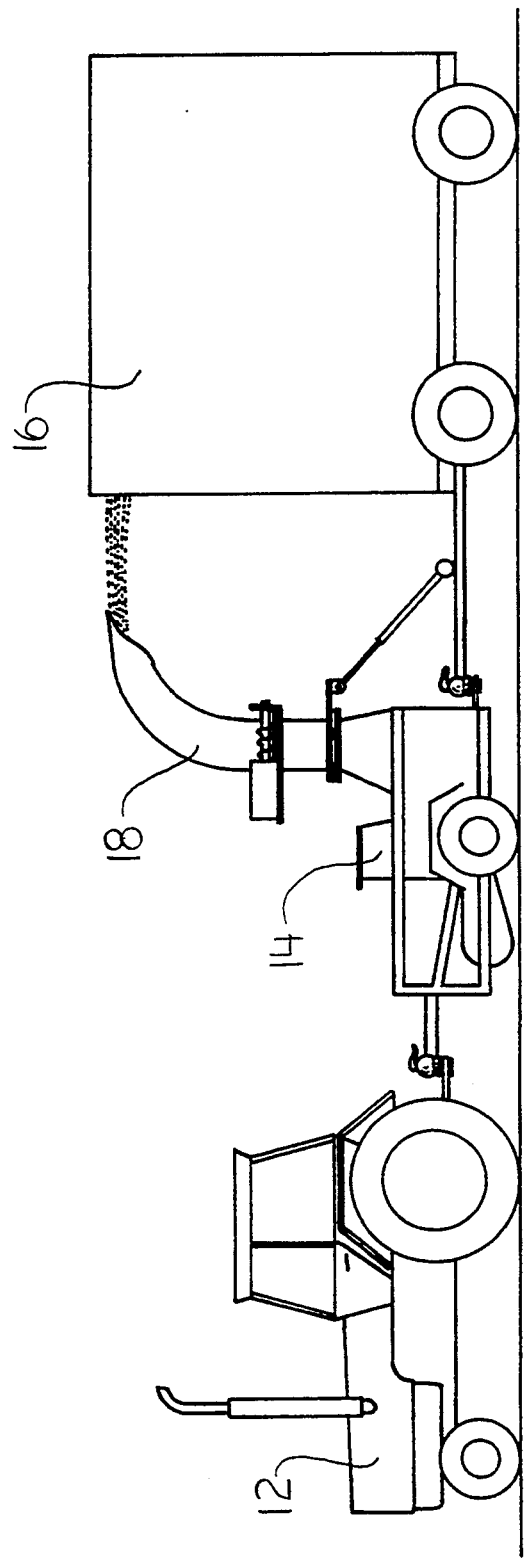
FIG. 1 is a side elevation view of an apparatus for controlling the direction of a crop discharge spout constructed in accordance with the teachings of the present invention.
Figure 2:
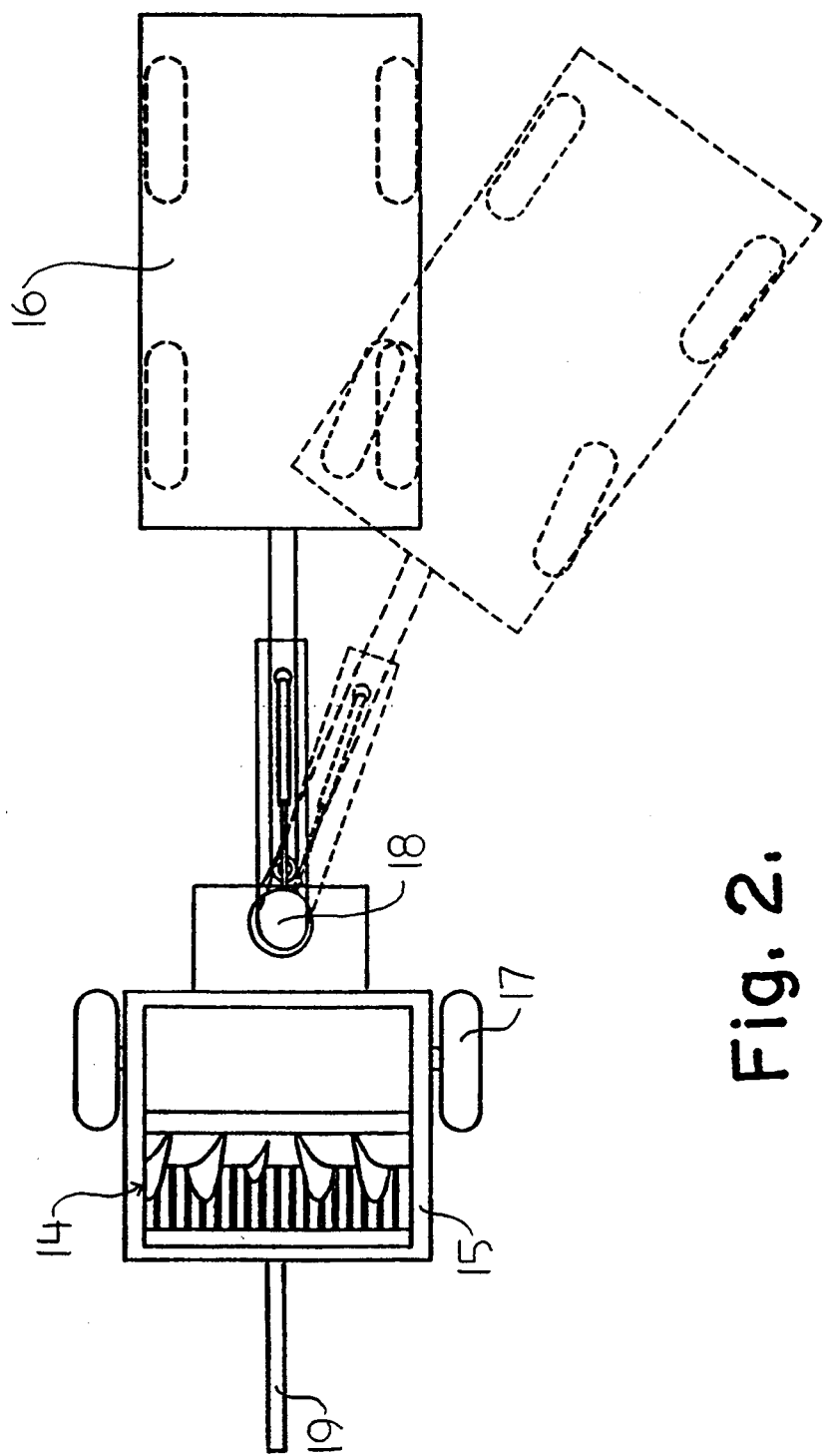
FIG. 2 is a top plan view of the apparatus illustrated in FIG. 1.

The preferred embodiment, an apparatus for controlling the direction of a crop discharge spout generally identified by reference numeral 10, will now be described with reference to FIGS. 1 through 6.

Figure 3:
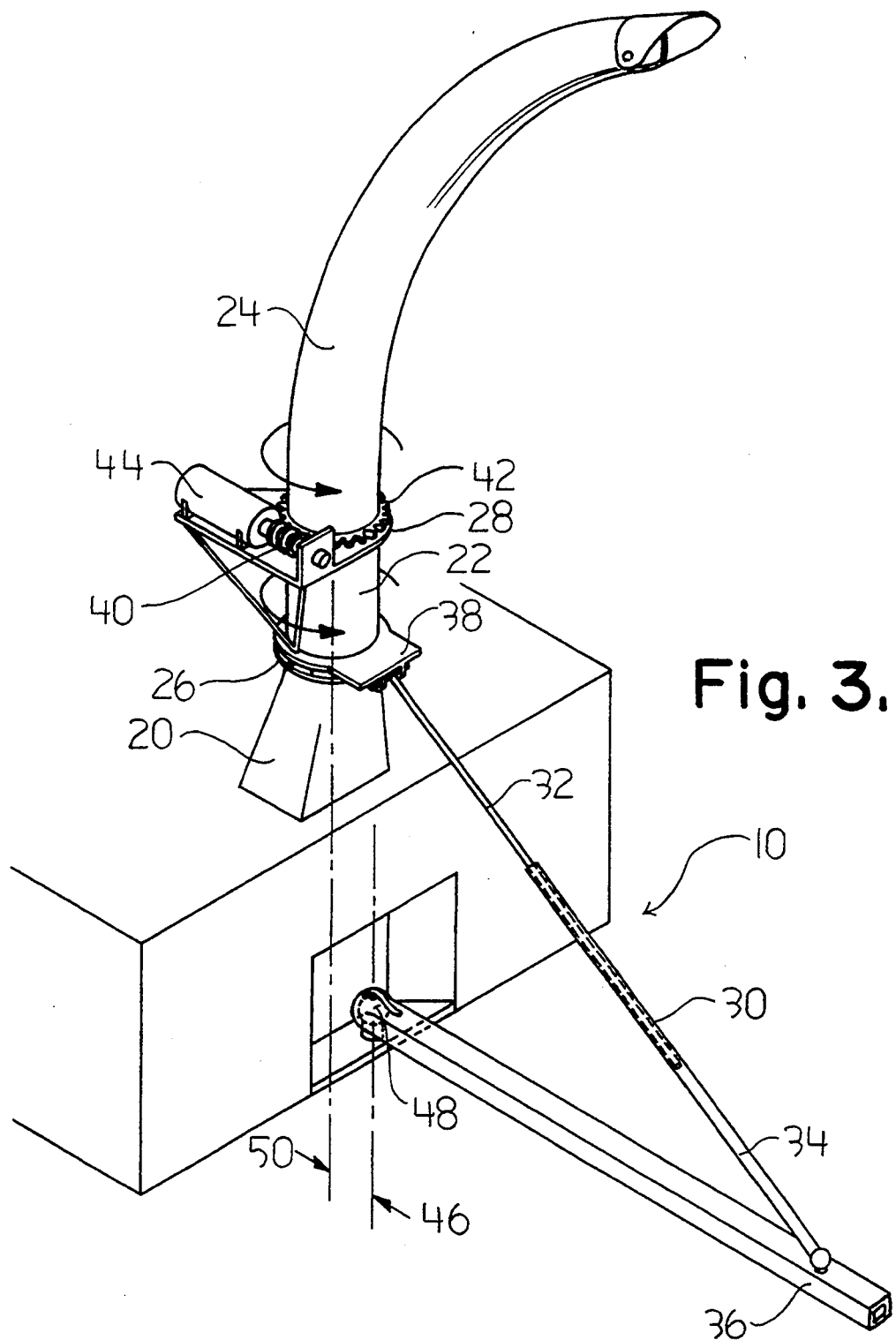
FIG. 3 is a perspective view of the apparatus illustrated in FIG. 1.
Figure 4:
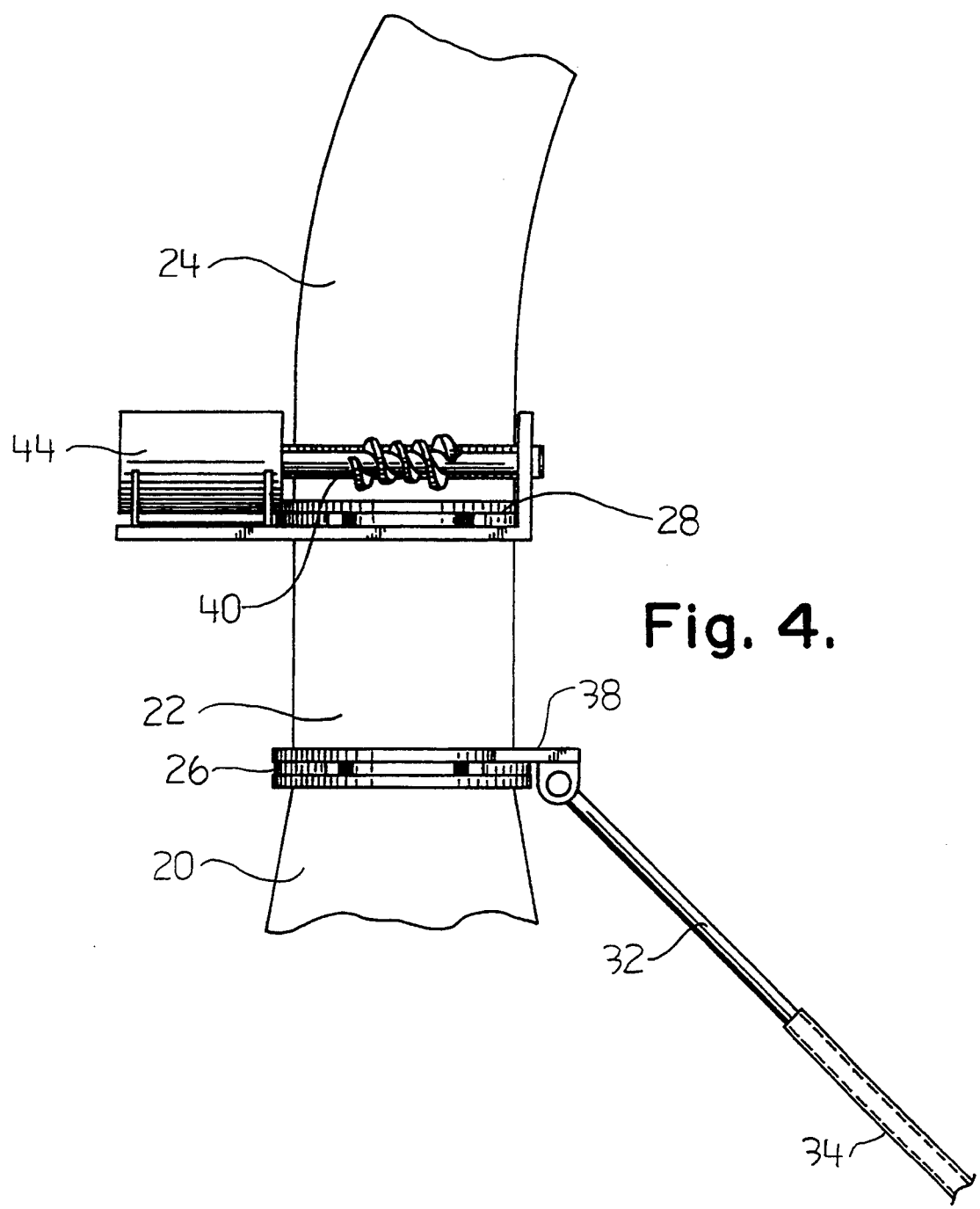
FIG. 4 is a detailed side elevation view of the apparatus illustrated in FIG. 1.
Figure 5:
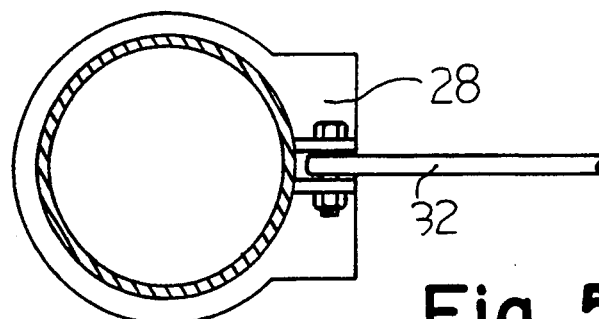
FIG. 5 is a section view taken along section lines 5—5 of FIG. 4.
Figure 6:
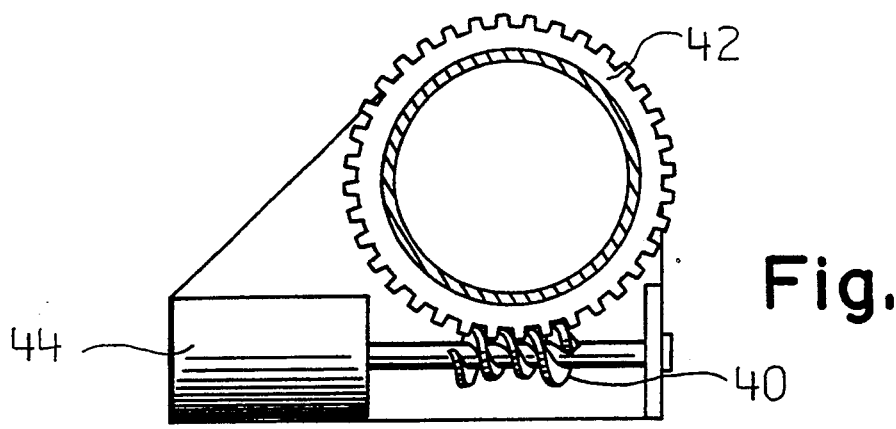
FIG. 6 is a section view taken along section lines 6—6 of FIG. 4.

Referring to FIG. 1, there is illustrated an agricultural "train" in which a tractor serves as a tow vehicle 12, a silage cutter serves as an agricultural machine 14 used to harvest a crop, and a wagon serves as an associated collector vehicle 16. Apparatus 10 is designed to control the direction of a crop discharge spout 18 on agricultural machine 14 with respect to associated collector vehicle 16. Referring to FIGS. 3 and 4, discharge spout 18 has a stationary first section 20, a second section 22 rotatable relative to first section 20 and a third section 24 rotatable relative to second section 22. First section 20 and second section 22 are rotatably connected at a lower joint 26. Second section 22 and third section 24 are rotatably connected at an upper joint 28. A telescopic member 30 constructed of two tubular members 32 and 34 extends between a drawbar 36 on collector vehicle 16 and second section 22. Tubular member 32 of telescopic member 30 is pivotally attached to a flange 38 on second section 22. A worm gear 40 is rotatably mounted on second section 22. Worm gear 40 engages an annular gear 42 mounted on third section 24 to incrementally rotate third section 24. An electric motor 44 is connected to worm gear 40. Discharge spout 18 has an axis 46. A hitch 48 on agricultural machine 14 to which drawbar 36 of collector vehicle 16 has an axis 50. The spacial relationship between axis 46 and axis 50 will hereinafter be further explained in relation to use and operation. As previously described agricultural machine 14 is a silage cutter. This silage cutter has a frame 15, ground engaging support wheels 17 rotatably secured to frame 15, a drawbar 19 secured to frame 15 whereby frame 15 is drawn behind tow vehicle 12. This silage cutter has been modified from silage cutters currently available commercially in that drawbar 19 is centrally positioned, as is discharge spout 18. In addition, discharge spout 18 and hitch 48 are positioned so as to maintain axis 46 is in close parallel spaced relation to axis 50.

The use and operation of apparatus 10 will now be described with reference to FIGS. 1 through 6. When tow vehicle 12 and agricultural machine 14 turn, the movement is communicated from drawbar 36 to discharge spout 18 through telescopic member 30. Telescopic member 30 is connected to second section 22. This forces second section 22 of discharge spout 18 to rotate about lower joint 26 in unison with drawbar 36 to maintain the position of discharge spout 18 relative to collector vehicle 16. Third section 24 moves with second section 22, unless electric motor 44 is activated. Upon activation of electric motor 44 worm gear 40 rotates. As worm gear 40 rotates a force is exerted upon annular gear 42 mounted on third section 24 which resulting in the rotation of third section 24. Electric motor 44 is not in constant use, but is merely used periodically to make incremental adjustments of discharge spout 18. This provides an operator of tow vehicle 12 with control over the aim of discharge spout 18. In normal operation the operator need not watch discharge spout 18 as telescopic member 30 forces discharge spout 18 to follow the movements of drawbar 36 on collector vehicle 16. As collector vehicle 16 begins to fill incremental movements of discharge spout 18 are desirable to direct the crop being discharged into the corners of collector vehicle 16. If an alternate collector vehicle, such as a truck, pulls alongside the operator can use electric motor 44 to rotate third section 14 to direct the crop into the alternate collector vehicle. It must be emphasized that electric motor is not in constant use, but only need be used periodically as conditions change. For the vast majority of the time the operator is driving with lots of capacity in collector vehicle 16 and discharge spout 18 is not in need of adjustment. Rough terrain is not a problem as tubular members 32 and 34 telescopic member 30 telescopically extend and retract in response to downward and upward deflections of drawbar 36.

It is preferred that axis 50 of hitch 48 on drawbar 36 be positioned in substantially close parallel alignment with axis 46 of discharge spout 18. Drawbar 36 is, almost without exception, centrally positioned on collector vehicle 16. The theory behind coupling second section 22 of discharge spout 18 to drawbar 36 is that by having discharge spout 18 aim along drawbar 36 you will always have discharge spout 18 aimed at the center of collector vehicle 16. The farther axis 46 and axis 50 are moved apart the greater the danger of adversely effecting the relationship. As axis 50 is moved to the left or right of axis 46 the angle of approach of discharge spout 18 to collector vehicle 16 differs from that of drawbar 36. At some point this distance will be come great enough to effect performance and discharge spout 18 will favor one side of collector vehicle 16 and may at time overshoot the opposed side. As axis 50 is moved back toward collector vehicle 16 and farther away from axis 46 the angle of approach is similarly altered. It is, therefore, preferred that agricultural machine 14 be a "center-pull" machine, with axis 46 and 50 close parallel spaced relation. This relationship virtually assures that discharge spout 18 will always assume the angle of drawbar 36. Some forms of agricultural equipment, such as silage cutters, are not currently made as center-pull machines.

It will be apparent to one skilled in the art that modifications may be made to the illustrated embodiment without departing from the spirit and scope of the invention as defined by the claims.

The embodiments of the invention in which an exclusive property or privilege is claimed are as follows:

1. An apparatus for controlling the direction of a crop discharge spout on an agricultural machine with respect to an associated collector vehicle, comprising:
   a. a discharge spout having at a stationary first section, a second section rotatable relative to the first section and a third section rotatable relative to the second section, the first section and the second section being rotatably connected at a lower joint and the second section and the third section being rotatably connected at an upper joint;
   b. a telescopic member extending between a drawbar on a collector vehicle and the second section, such that the second section of the discharge spout rotate about the lower joint in unison with the drawbar to maintain spout positioning relative to the collector vehicle, the telescopic member telescopically extending and retracting in response to downward and upward deflections of the drawbar; and
   c. drive means between the second section and the third section, the drive means causing rotation of the third section about the upper joint, whereby control over the aim of the discharge spout is maintained by the operator.

2. The apparatus as defined in claim 1, the drive means including a rotatably mounted worm gear on the second section that engages an annular gear mounted on the third section to incrementally rotate the third section.

3. The apparatus as defined in claim 2, the means for rotating the worm gear being an electric motor.

4. The apparatus as defined in claim 1, the agricultural machine being a silage cutter.

5. The apparatus as defined in claim 4, the silage cutter having a centrally positioned drawbar and a centrally positioned discharge spout.

6. The apparatus as defined in claim 1, the discharge spout having an axis which is in close parallel spaced relation to an axis of a hitch on the agricultural machine to which the drawbar on the collector vehicle is attached.

7. An apparatus for controlling the direction of a crop discharge spout on an agricultural machine with respect to an associated collector vehicle, comprising:
   a. a discharge spout having at a stationary first section, a second section rotatable relative to the first section and a third section rotatable relative to the second section, the first section and the second section being rotatably connected at a lower joint, the second section and the third section being rotatably connected at a upper joint;
   b. a telescopic member extending between a drawbar on a collector vehicle and the second section, such that the second section of the discharge spout rotates about the lower joint in unison with the drawbar to maintain spout positioning relative to the collector vehicle, the telescopic member telescopically extending and retracting in response to downward and upward deflections of the drawbar;
c. a rotatably mounted worm gear on the second section engages an annular gear mounted on the third section to incrementally rotate the third section;
d. an electric motor connected to the wormgear such that activation of the motor causes rotation of the worm gear thereby providing the operator of the tow vehicle with control over the aim of the discharge spout; and
e. the discharge spout having an axis which is in close parallel spaced relation to an axis of a hitch on the agricultural machine to which the drawbar of the collector vehicle is attached.

8. An improvement in a silage cutter having a frame, ground engaging support wheels rotatably secured to the frame, a drawbar secured to the frame whereby the frame is drawn behind a tow vehicle, silage cutting means and a discharge spout, the improvement comprising:

a. the draw bar being centrally positioned on the frame;
b. the discharge spout having an axis and being centrally positioned on the frame, the discharge spout having a stationary first section, a second section rotatable relative to the first section and a third section rotatable relative to the second section, the first section and the second section being rotatably connected at a lower joint and the second section and the third section being rotatably connected at an upper joint;
c. means for coupling the second section of the discharge spout to a drawbar on a collector vehicle;
d. drive means between the second section and the third section, the drive means causing rotation of the third section about the upper joint, whereby control over the aim of the discharge spout is maintained by an operator; and
e. a hitch attached to the frame, the hitch having an axis which is in close parallel spaced relation to the axis of the discharge spout.

* * * * *